United States Patent [19]
Cho

[11] Patent Number: 6,117,804
[45] Date of Patent: Sep. 12, 2000

[54] PROCESS FOR MAKING A MINERAL POWDER USEFUL FOR FIBER MANUFACTURE

[75] Inventor: Eung-Hwa Cho, Pusan-si, Rep. of Korea

[73] Assignee: Han IL Mulsan Co., Ltd., Pusan-si, Rep. of Korea

[21] Appl. No.: 08/846,509

[22] Filed: Apr. 29, 1997

[51] Int. Cl.$^7$ ............................. C03C 3/253; C03C 4/10; C04B 35/00; A01N 59/00

[52] U.S. Cl. ................................ 501/1; 501/42; 501/73; 501/94; 501/904; 424/650; 424/684; 252/1

[58] Field of Search .................................. 501/1, 42, 73, 501/94, 904; 424/650, 684; 252/1

[56] References Cited

U.S. PATENT DOCUMENTS

| | | | |
|---|---|---|---|
| 3,232,772 | 2/1966 | Hilton et al. | 501/84 |
| 3,729,328 | 4/1973 | Magder | 106/640 |
| 3,944,425 | 3/1976 | Magder | 501/84 |
| 3,947,373 | 3/1976 | Sobajima et al. | 523/200 |
| 3,961,120 | 6/1976 | Hearn et al. | 428/210 |
| 4,451,415 | 5/1984 | Terada | 264/43 |
| 4,647,477 | 3/1987 | DeLuca | 427/98 |
| 5,399,833 | 3/1995 | Camacho | 219/121.59 |
| 5,935,483 | 8/1999 | Kong | 252/1 |

OTHER PUBLICATIONS

"Piopower Rare Materials", Korea Ore Research Institute, Dec. 10, 1996, pp. 1–20.
"Espino Rare Materials", Korea Ore Research Institute, Dec. 10, 1996, pp. 1–20.

*Primary Examiner*—P. Hampton-Hightower
*Attorney, Agent, or Firm*—Skjerven, Morrill, MacPherson, Franklin & Friel LLP; Alan H. MacPherson

[57] ABSTRACT

A process of making a mineral powder usable for manufacturing functional fiber includes pulverizing mineral ingredients including germanium of 60 weight percent, biostrome of 20 weight percent, jade of 10 weight percent, anorthite of 5 weight percent and minerals of 5 weight percent to about 100 mesh and charging the mineral ingredients into an internal furnace of copper having a wall thickness of 2–5 mm; placing feldspar pulverized to about 325 mesh between an inner surface of an electric heating plate and an outer surface of the internal furnace; heating the mineral ingredients and feldspar for seven days at about 1000° C. by means of the electric heating plate; pulverizing the mineral ingredients having had thermal deformation from the internal furnace again to more than about 325 mesh; placing the pulverized mineral ingredients into the internal furnace again; charging the internal furnace with the burnt feldspar; again heating the mineral ingredients for three days at 1000° C. to thermally deform the mineral ingredients and pulverizing the re-pulverized and re-heated mineral ingredients to more than about 500 mesh.

1 Claim, 2 Drawing Sheets

PROCESS FOR MAKING A MINERAL POWDER USEFUL FOR FIBER MANUFACTURE

BACKGROUND OF THE INVENTION

1. Field of the Invention

The present invention relates to mineral powder for manufacturing fiber and its process, and particularly to mineral powder for manufacturing fiber having specific functions of antibacterial performance, prevention of decoloration, deodorization, etc., and its manufacturing process.

2. Description of the Related Art

The clothes made of the conventional fiber having specific functions were publicly known. For example, it is known that socks being sold with the brand name of "BIOSIL" have the specific functions of antibacterial performance, prevention of decoloration, deodorization, etc. In addition to the commodities, as the level of national life standards are improved, fiber having various functions of thermal insulation, prevention of decoloration, waterproof, fireproof, etc., is required.

SUMMARY OF THE INVENTION

An object of the present invention is to provide mineral powder for manufacturing fiber having specific functions of thermal insulation, prevention of decoloration, waterproof, fireproof, etc. by using far infrared rays and negative ion, and its manufacturing process.

In general, infrared rays refer to a sort of electromagnetic wave having the wavelength range of 0.76–1000 micron ($\mu$). Near infrared rays have the wavelength of 0.76–1.5 micron, intermediate infrared rays have the wavelength of 1.5–5.6 micron and far infrared rays have the wavelength of 5.6–1000 micron (Far Infrared Business published by Sunmark on Dec. 25, 1988).

Far infrared rays are used for various purposes such as heating, drying, ripening, nurturing and alleviation of pain. It is also known that application of the far infrared rays to the human body provides the perspiration operation which secretes lots of sweat and the operation for alleviation of pain. In addition, since the announcement of a clinical test which reveals good effects for the biological rhythm of the human body, there are many trials for using the far infrared rays desirably in the health industry or the food industry ("Theory and Practice for Heating of Far Infrared Rays" pp226–239 by Far Infrared Rays Committee of Japan Electric Heat). As a consequence, a variety of goods using the far infrared rays are produced in large quantities and sold in the market, nowadays. For example, a sauna using far infrared rays can improve the perspiration operation of the human body with the lower temperature than that of a steam sauna. In other words, in case of a steam sauna, steam of high temperature(about 70–80° C.) is being supplied in a sauna room, and thus users are unable to endure for a long time within the sauna room. However, the far infrared rays sauna has the higher perspiration operation than that of the steam sauna, even with the inner temperature of about 40° C. This explains the phenomena that the far infrared rays are absorbed in the human body and a self-generated heating is caused by means of the resonance operation of water particle within the human body.

It is a known fact that negative ion is opposite to positive ion. With reference to the human body, the theory which Mr. Bert Sakmann and Mr. E. Necher jointly studied and expressed and consequently won the prize for Nobel Physiology and Medical Science Award in 1991, reveals that a disease structure can be detected through the movement of negative ion within the cell. Namely, in the event that the human body having neutral has much positive ion due to external or internal effects, interest concerning negative ion with intent to fill up the depleted negative ion by using food or life environmental device is at its high pitch.

Applying properly negative ion to the human body having much positive ion, it is known that an autonomic nerve adjusting operation, purification operation of the blood, cell revival operation and resistance improvement operation of the cell effect.

Various ions in the atmosphere vary according to the weather condition. When a low atmospheric pressure such as a line of discontinuity and a cold front passes, positive ion increases, and with these effects, negative ion within the human body decreases and the positive ion increases thereby the occurrence rate of the disease such as neuralgia, cerebral apoplexy and asthma increases.

The conventional product emitting far infrared rays by using the material having the brand name of "BIO CERAMIC" was sold in the market. In such product, the specific functions such as the antibacterial effects, prevention of decoloration, deodorization, etc., are maximized by mixing mineral matter having the specific function to the ceramic material or applying chemical substance thereto. The product is supplied in the form of powder, particle or liquid phase.

However, the conventional far infrared rays emitting material(product) had difficulties for being coated on fiber or dyeing of fiber. Also, only the far infrared rays were emitted or emitting quantity of the far infrared rays was not sufficient. Further, as such material contains the various chemical substance, it was difficult for persons having an idiosyncrasy to use the material.

To solve such difficulties or problems, the present invention is to provide mineral powder excluding chemical substance and having only the processed natural mineral which emits the large quantity of negative ion and far infrared rays and is suitable to manufacture fiber having specific functions as well.

DETAILED DESCRIPTION OF THE PREFERRED EMBODIMENT

Hereinafter, desirable examples of the present invention will be described with reference to the accompanying drawings.

Figure 1:
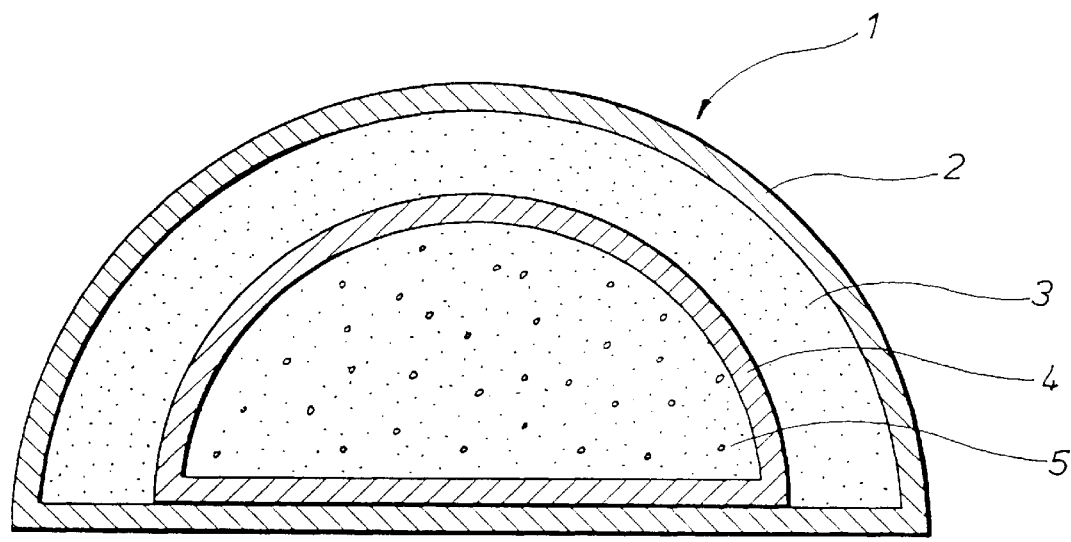
FIG. 1 is a schematic view illustrating a furnace for manufacturing mineral powder for manufacturing functional fiber according to the present invention.

Referring to FIG. 1, a furnace 1 for manufacturing mineral powder for multi-purposes comprises an electric heating plate 2 and an internal furnace 4 made of copper having the thickness of 2–5 mm.

The electric heating plate 2 is heated with gas or the other fuel.

Germanium of 60 weight percent, biostrome (a body of rock composed mainly of the remains of sedentary organisms such as shell beds, crinoid beds, or coral beds) of 20 weight percent, jade of 10 weight percent, anorthite (a mineral consisting of feldspar of oblique triclinic crystallization, composed of calcium aluminum silicate) of 5 weight percent and minerals of 5 weight percent are initially pulverized with about 100 mesh by using a normal pulverizer and charged.

After placing feldspar pulverized with about 325 mesh between the inner surface of the electric heating plate 2 and the external surface of the internal furnace 4, it is heated through the electric heating plate 2 for seven days at about 1000° C. The biostrome enters into combustion at the initial temperature of 1000° C. and due to its burning heat during the combustion the temperature rises up to about 2000° C. The burnt feldspar is removed and the initially heated five kinds of mineral lumps are taken out and pulverized with about 325 mesh as the second step. After that, 1.5 tons of feldspar pulverized with about 325 mesh are newly placed and heated for three days as the second heating step. An intense heat causes thermal deformation to such five kinds of mineral ingredients within the internal furnace 4 and consequently, heavy metals harmful to the human body are burnt out, and it becomes a lump of form which has the main ingredients having natural mineral, as shown in Table 1. After the feldspar is burnt, a slow cooling is conducted.

Figure 2:
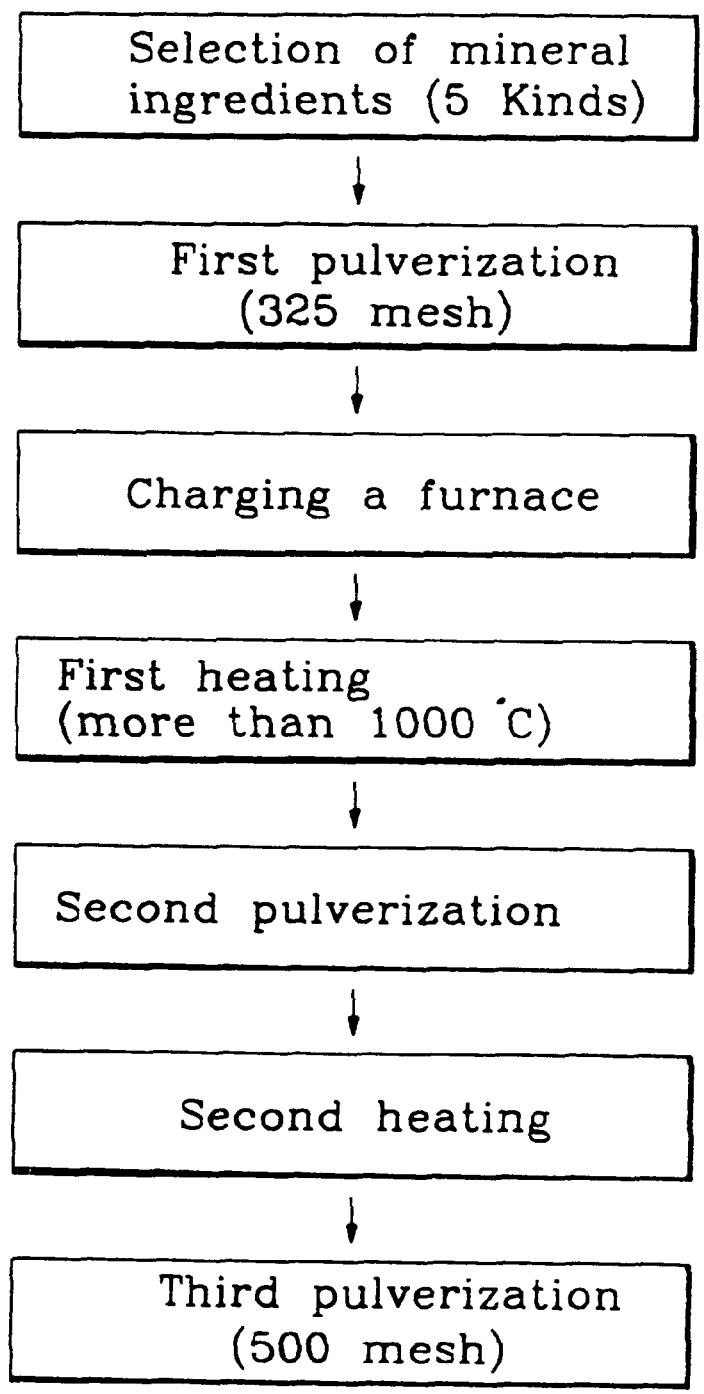
FIG. 2 is a block diagram illustrating the manufacturing progress of the mineral powder for manufacturing functional fiber according to the present invention.

As shown in FIG. 2, such lump is secondly pulverized again fine with about 500 mesh.

TABLE 1

| Ingredient | Content (weight percent) |
| --- | --- |
| Moisture | 1.15 |
| Silicic anhydride ($SiO_2$) | 63.5 |
| Oxidized aluminum ($Al_2O_3$) | 14.0 |
| Ferrous oxide (FeO) | 2.84 |
| Magnesium (MgO) | 1.14 |
| Calcium (CaO) | 1.65 |
| Natrium ($Na_2O$) | 1.59 |
| Volatile matter | 1.59 |
| Kalium oxide ($K_2O$) | 4.03 |
| Titanium dioxide ($TiO_2$) | 0.30 |
| Phosphoric anhydride ($P_2O_5$) | 0.05 |
| Manganese oxide (MnO) | 0.20 |
| Water of hydration ($H_2O$) | 1.90 |
| Water of adhesion ($H_2O$) | 0.35 |
| Ge | 4.5 |
| Ignition loss | 1.56 |

The ingredients of mineral powder according to the present invention described in Table 1 emit far infrared rays and negative ion which are very salutable for the human body.

The ingredients of mineral powder according to the present invention has more than 99.0% of far infrared rays radiation ratio having the wavelength of 8–14 micron at 39° C. and emits more than eight hundred thousand number of negative ion per 1 kg of the ingredient and the calorific value of oxygen is 520 Kcal. With reference to the method of examination herein, the far infrared rays were measured by applying KS.A 5302-91, negative ion was measured by applying Negative Ion Measuring Equipment Model No. MDK-01C of a Company, Messrs. Schomandl in Germany and the calorific value of oxygen was measured by applying KS.E 3707-90.

The aforesaid ingredient has the pH of 7.3–7.5.

Mineral powder according to the present invention is the mineral matter emitting the large quantity of far infrared rays and negative ion. It is the useful invention which can be coated on fiber and dyeing of fiber can be provided.

What is claimed is:

1. A process of making a mineral powder useful for manufacturing a fiber comprising:

pulverizing mineral ingredients comprising germanium of approximately 60 weight percent, biostrome of approximately 20 weight percent, jade of approximately 10 weight percent, anorthite of approximately 5 weight percent and minerals of approximately 5 weight percent to about 100 mesh and charging the mineral ingredients in an internal furnace of copper having a wall thickness of 2-5 mm;

placing feldspar pulverized to about 325 mesh between an inner surface of an electric heating plate and an outer surface of the internal furnace;

heating the mineral ingredients and the feldspar for approximately seven days at about 1000° C. by means of said electric heating plate to provide burnt feldspar;

re-pulverizing said mineral ingredients, said mineral ingredients having been thermally deformed in the internal furnace to more than about 325 mesh;

placing said re-pulverized mineral ingredients into the internal furnace;

charging the internal furnace with the burnt feldspar; re-heating the re-pulverized mineral ingredients for approximately three days at 1000° C. to thermally deform the mineral ingredients; and again pulverizing the re-heated mineral ingredients to more than about 500 mesh.

* * * * *